(12) United States Patent
Martin et al.

(10) Patent No.: US 7,918,215 B2
(45) Date of Patent: Apr. 5, 2011

(54) COMPRESSOR STAGE ASSEMBLY LOCK

(75) Inventors: Steven P. Martin, Walnut, CA (US); Christopher O. Meade, Redondo Beach, CA (US); Andrew F. McGraw, Los Angeles, CA (US)

(73) Assignee: Honeywell International Inc., Morristown, NJ (US)

( * ) Notice: Subject to any disclaimer, the term of this patent is extended or adjusted under 35 U.S.C. 154(b) by 984 days.

(21) Appl. No.: 11/429,817

(22) Filed: May 8, 2006

(65) Prior Publication Data
US 2007/0256412 A1    Nov. 8, 2007

(51) Int. Cl.
*F02B 33/44*    (2006.01)
*F02B 29/04*    (2006.01)

(52) U.S. Cl. ........ 123/559.1; 60/598; 415/158; 415/206
(58) Field of Classification Search .................. 417/407; 415/158, 206; 403/318, 319; 24/20 R; 123/559.1; 60/598
See application file for complete search history.

(56) References Cited

U.S. PATENT DOCUMENTS

| | | | |
|---|---|---|---|
| 2,757,857 A * | 8/1956 | Savin, Jr. .................. | 416/244 R |
| 4,077,232 A * | 3/1978 | Grosseau ...................... | 464/169 |
| 4,358,253 A | 11/1982 | Okano et al. | |
| 4,376,617 A | 3/1983 | Okano et al. | |
| 4,447,750 A | 5/1984 | Howlett et al. | |
| 4,741,225 A | 5/1988 | Hall, III et al. | |
| 5,025,629 A | 6/1991 | Wollenweber | |
| 5,176,413 A * | 1/1993 | Westman ...................... | 285/321 |
| 5,499,884 A * | 3/1996 | Kuhnhold et al. .......... | 403/359.5 |
| 5,522,697 A * | 6/1996 | Parker et al. .................. | 415/158 |
| 6,032,466 A | 3/2000 | Wollenweber et al. | |
| 7,614,818 B2 * | 11/2009 | Gutierrez et al. .......... | 403/359.5 |

FOREIGN PATENT DOCUMENTS

| | | |
|---|---|---|
| EP | 0184962 | 12/1985 |
| EP | 1057978 | 9/1995 |
| GB | 2271814 | 4/1994 |

OTHER PUBLICATIONS

ISR WO PCT/07/068319.

* cited by examiner

*Primary Examiner* — Devon C Kramer
*Assistant Examiner* — Patrick Hamo
(74) *Attorney, Agent, or Firm* — Brian Pangrle

(57) ABSTRACT

The present invention relates to a turbocharger assembly lock comprising a retaining ring partially disposed in a circumferential groove of a first turbocharger stage component and partially in a circumferential groove of a second turbocharger stage component so that the turbocharger stages are securely attached to each other.

15 Claims, 5 Drawing Sheets

COMPRESSOR STAGE ASSEMBLY LOCK

CROSS-REFERENCES TO RELATED APPLICATIONS

Not Applicable.

BACKGROUND OF THE INVENTION

1. Field of the Invention (Technical Field)

The present invention relates to turbocharger compressor assemblies, particularly to means for attaching one turbocharger stage component, such as a compressor assembly, to another stage component, such as a second compressor assembly or a turbocharger center housing rotating assembly.

2. Description of Related Art

Note that where the following discussion refers to a number of publications by author(s) and year of publication, because of recent publication dates certain publications are not to be considered as prior art vis-a-vis the present invention. Discussion of such publications herein is given for more complete background and is not to be construed as an admission that such publications are prior art for patentability determination purposes.

Turbochargers for pressurizing or boosting the intake air stream into an internal combustion engine include several stage components such as an exhaust gas turbine through which the engine's exhaust gas is routed so that the exhaust gas turbine spins within the turbocharger housing. Typically, the exhaust gas turbine is connected via a shaft in a center housing rotating assembly ("CHRA") to a radial air compressor impeller disposed within a compressor housing so that as the exhaust gas turbine turns, the compressor impeller also turns within the compressor housing and causes intake air to axially enter the compressor housing, go past the impeller, then change direction past a diffuser before entering a compressor housing volute. After the intake air is pressurized or boosted, it exits the turbocharger to be mixed with fuel that is then sent to the engine combustion chamber.

Turbocharger stage components are typically attached to each other via clamp plates, bolts, etc. For example, compressor housings are typically attached to the CHRA via clamp plates and bolts. Such an assembly requires several separate turbocharger parts and the consequent attention to assembly torques required for all fasteners. Therefore, there exists a potential for poor quality assembly as a result of the application of improper torque on the assembly fasteners. There are also greater turbocharger assembly costs as a result of using clamp plates and bolts and greater manufacturing costs associated with threaded holes.

Therefore, there is a need for an inexpensive and precise means to assemble turbocharger stages to each other. Unlike bolts and other fasteners requiring specific assembly torques, the use of snap rings typical in many applications today, including "horse shoe" shaped snap rings, can be simpler and less expensive to utilize if properly applied in the assembly of turbocharger systems.

BRIEF SUMMARY OF THE INVENTION

The present invention provides a turbocharger stage assembly lock to mate a first turbocharger stage to a second turbocharger stage through the use of a retaining ring partially disposed within a circumferential groove in the first turbocharger stage and partially within a circumferential groove in the second turbocharger stage.

Therefore, an embodiment of the present invention comprises a turbocharger assembly comprising a first turbocharger stage having a ring groove, a retaining ring disposed in the ring groove, said retaining ring having an adjustable circumference, and a second turbocharger stage adjacent to the first turbocharger stage, said second turbocharger stage having a mating groove within which the retaining ring is fitted to mate the ring groove and the mating groove and thus secure the first turbocharger stage to the second turbocharger stage.

Another embodiment of the present invention comprises a method for attaching turbocharger stages to each other, the method comprising disposing a ring groove in a first turbocharger stage, disposing a retaining ring having an adjustable circumference in the ring groove, disposing a mating groove in a second turbocharger stage, bringing the first turbocharger stage and the second turbocharger stage together and simultaneously changing the circumference of the retaining ring, and allowing the retaining ring to resume its original circumference, when the ring groove and the mating groove come together, by snapping into position so that the retaining ring resides partially in the ring groove and partially in the mating groove, thus attaching the first turbocharger stage to the second turbocharger stage.

An object of the present invention is to provide an effective and simplified means to attach a first turbocharger stage component to a second turbocharger stage component.

An advantage of the present invention is that assembly and parts costs are minimized.

Other objects, advantages and novel features, and further scope of applicability of the present invention will be set forth in part in the detailed description to follow, taken in conjunction with the accompanying drawings, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention provides a turbocharger assembly lock comprising a retaining ring and circumferential grooves for attaching turbocharger stages (i.e., stage components) such as, but not limited to, a compressor, a turbine, and/or a center housing rotating assembly to each other. Thus, the present invention comprises a retaining ring and grooves disposed in the turbocharger stages for attaching the turbocharger stages to each other. For example, an embodiment of the present invention comprises a retaining ring to attach a compressor stage to a center housing rotating assembly ("CHRA"). Also, the retaining ring of the present invention is applicable to single stage compressors and two stage compressor assemblies. As used in the specification and claims herein, the terms "a", "an", and "the" mean one or more.

Figure 1:
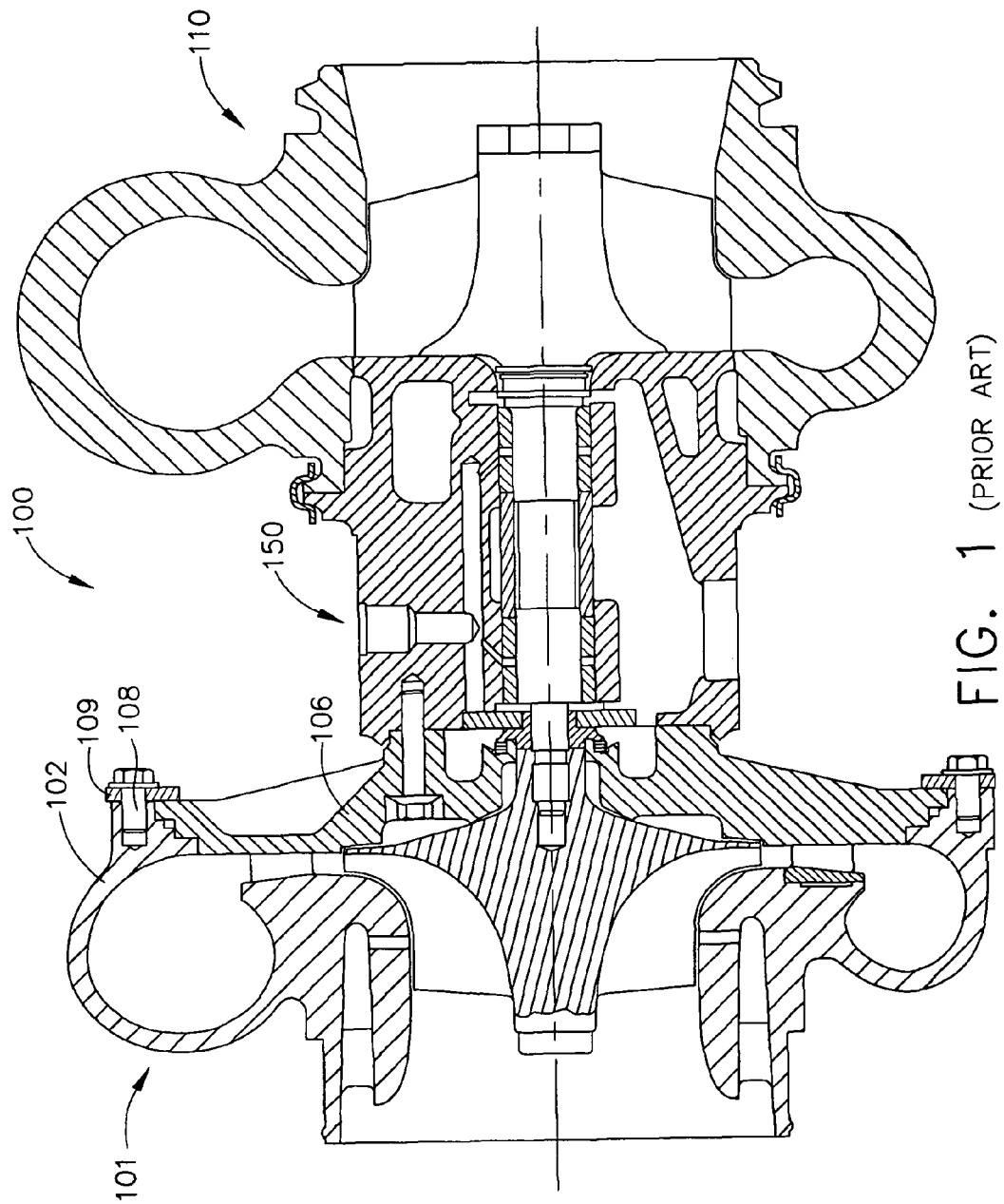
FIG. 1 is a cross section view of a turbocharger of the prior art.

Therefore, although the description and figures depict, for illustrative purposes, the attachment of a compressor stage to another turbocharger stage, it is understood that the attachment/assembly of other turbocharger stage components utilizing the present invention is within the scope of the invention Turning to the figures, FIG. 1 shows a turbocharger assembly 100 of the prior art wherein turbine 110 is attached to CHRA 150, and compressor 101 is attached to CHRA 150 via the attachment of compressor housing 102 secured to backplate 106 using bolt 108 and clamp plate 109.

In all embodiments of the present invention, bolt 108 and clamp plate 109 of FIG. 1 are replaced by a retaining ring which is a snap ring that, in accordance with the present invention, comprises an opening or break in its circumferential structure so that its circumference can be expanded by being forced open or compressed by being forced closed, followed by a return to its original shape upon release of the pressure forcing it open or closed. Therefore, the retaining ring comprises a variably adjustable circumference. The retaining ring is disposed into a circumferential recess groove, referred to herein as a "ring groove", of a first turbocharger stage. A second turbocharger stage also comprises a circumferential recess groove, referred to herein as a "mating groove". Upon mating of the turbocharger stages, the retaining ring resides partially in the ring groove and partially in the mating groove. As used in the specification and claims herein, the term "groove" denotes or means a groove having a bottom, two generally opposing sides, and an open face opposite the bottom.

Figure 2:
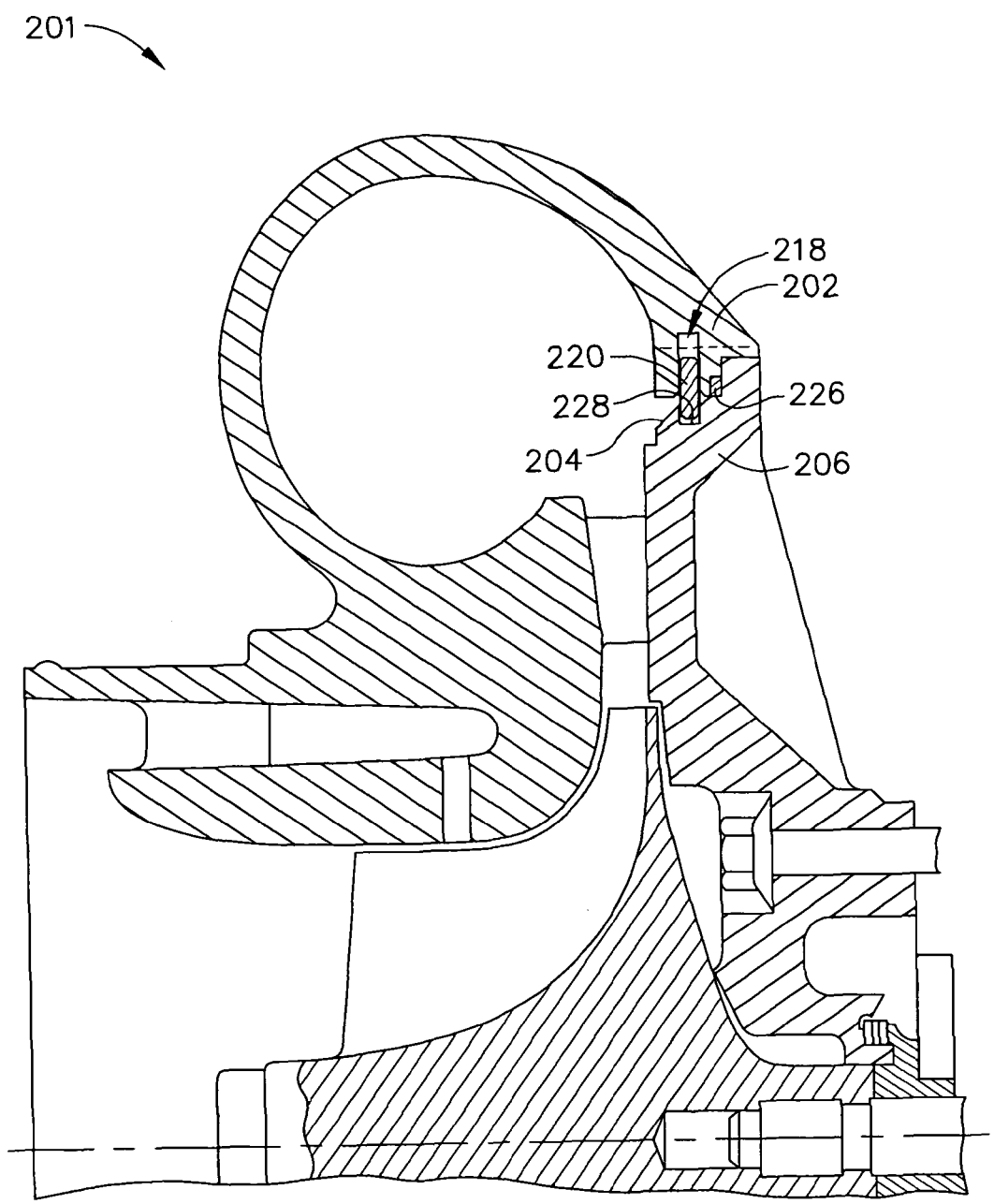
FIG. 2 is a close-up cross section view of an embodiment of the present invention showing a turbocharger compressor housing comprising a retaining ring used to secure the compressor housing to a backplate.

An embodiment of the present invention is illustrated in FIG. 2 wherein housing 202 of compressor 201 (the first compressor stage) comprises ring groove 218 (for consistency herein, the first compressor stage is that which comprises a ring groove) into which retaining ring 220 is disposed prior to assembly of housing 202 onto backplate 206. Backplate 206 (a part of the second compressor stage, the CHRA) comprises mating groove 228. For assembly, compressor housing 202 and backplate 206 are brought together (for example, compressor housing 202 is moved onto backplate 206) so that retaining ring 220 is forced open. The increase in the circumference of retaining ring 220 is accommodated by ring groove 218, which is of sufficient depth to accommodate the expansion of retaining ring 220. As shown in the figures, the retaining ring is disposed so that its circumference is oriented along a plane substantially perpendicular to the center, longitudinal axis of a given turbocharger stage, although the orientation may vary depending on the application. Preferably, circumferential chamfer or bevel 204 is provided to aid in the expansion of retaining ring 220. Retaining ring 220 then slides onto backplate 206 until it reaches mating groove 228 whereupon retaining ring 220 snaps back to its original shape/circumferential dimension so that it resides within both ring groove 218 and mating groove 228 to secure housing 202 to backplate 206. Therefore, retaining ring 220 mates ring groove 218 and mating groove 228, thus mating the first turbocharger stage to the second turbocharger stage.

Figure 3:
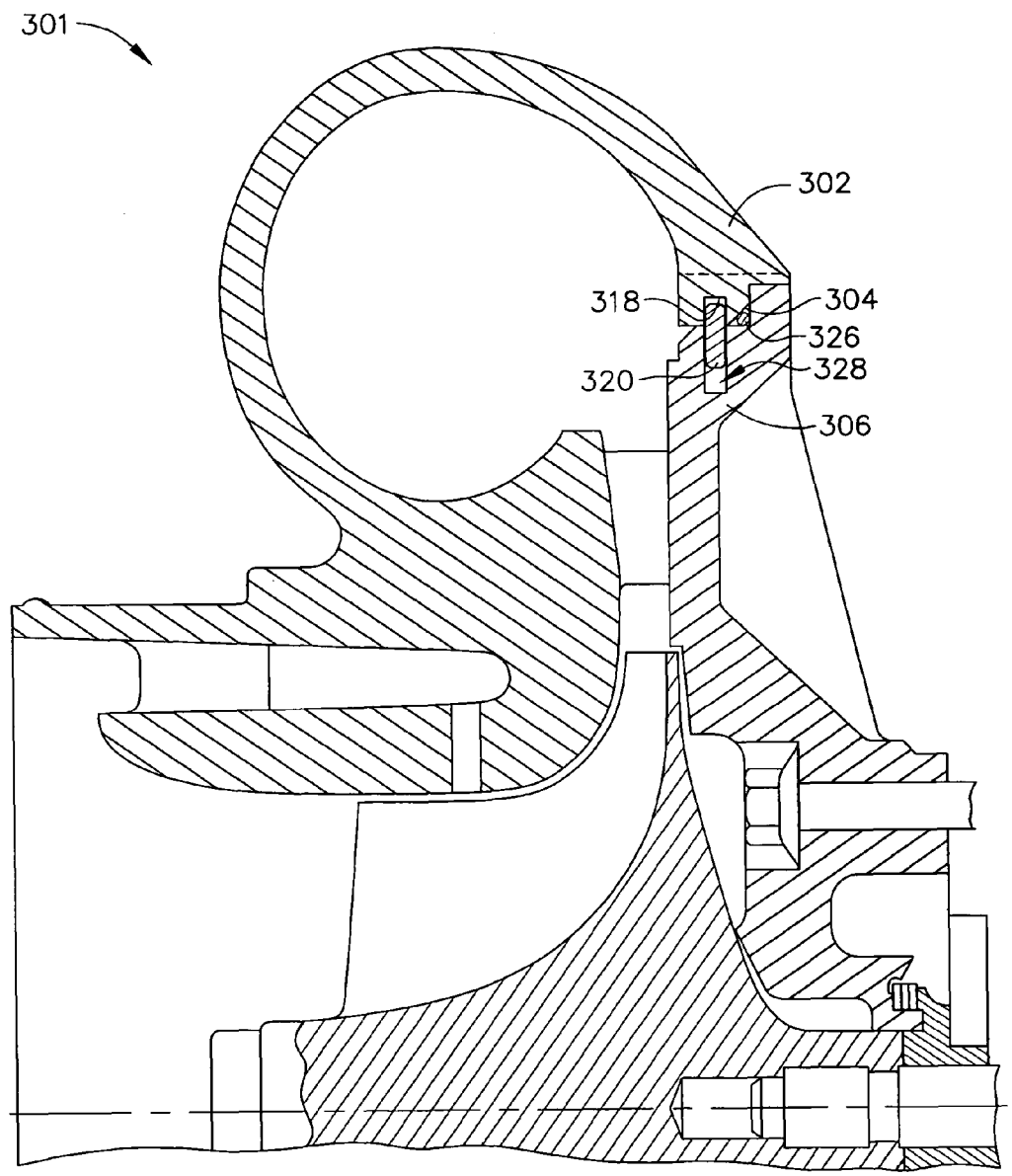
FIG. 3 is a close-up cross section view of an embodiment of the present invention showing a turbocharger backplate comprising a retaining ring used to secure a turbocharger compressor to the backplate.

In another embodiment, shown in FIG. 3, the position of the ring groove is the reverse of that shown in FIG. 2 but otherwise is similar in concept to that shown in FIG. 2. In this embodiment, backplate 306 (of the first compressor stage) comprises backplate ring groove 328 into which retaining ring 320 is disposed prior to assembly of housing 302 of compressor 301 onto backplate 306. Compressor 301 (i.e., the second compressor stage) comprises mating groove 318. For assembly, compressor housing 302 is pushed onto backplate 306 so that retaining ring 320 is forced closed, to decrease its circumference, and the change in circumference is accommodated further by ring groove 328. Preferably, circumferential chamfer or bevel 304 is provided to aid in the compression of retaining ring 320 as the two turbocharger stage components are moved together. Retaining ring 320 then slides along housing 302 until it reaches mating groove 318 whereupon retaining ring 320 snaps back to its original shape.

Figure 4A:
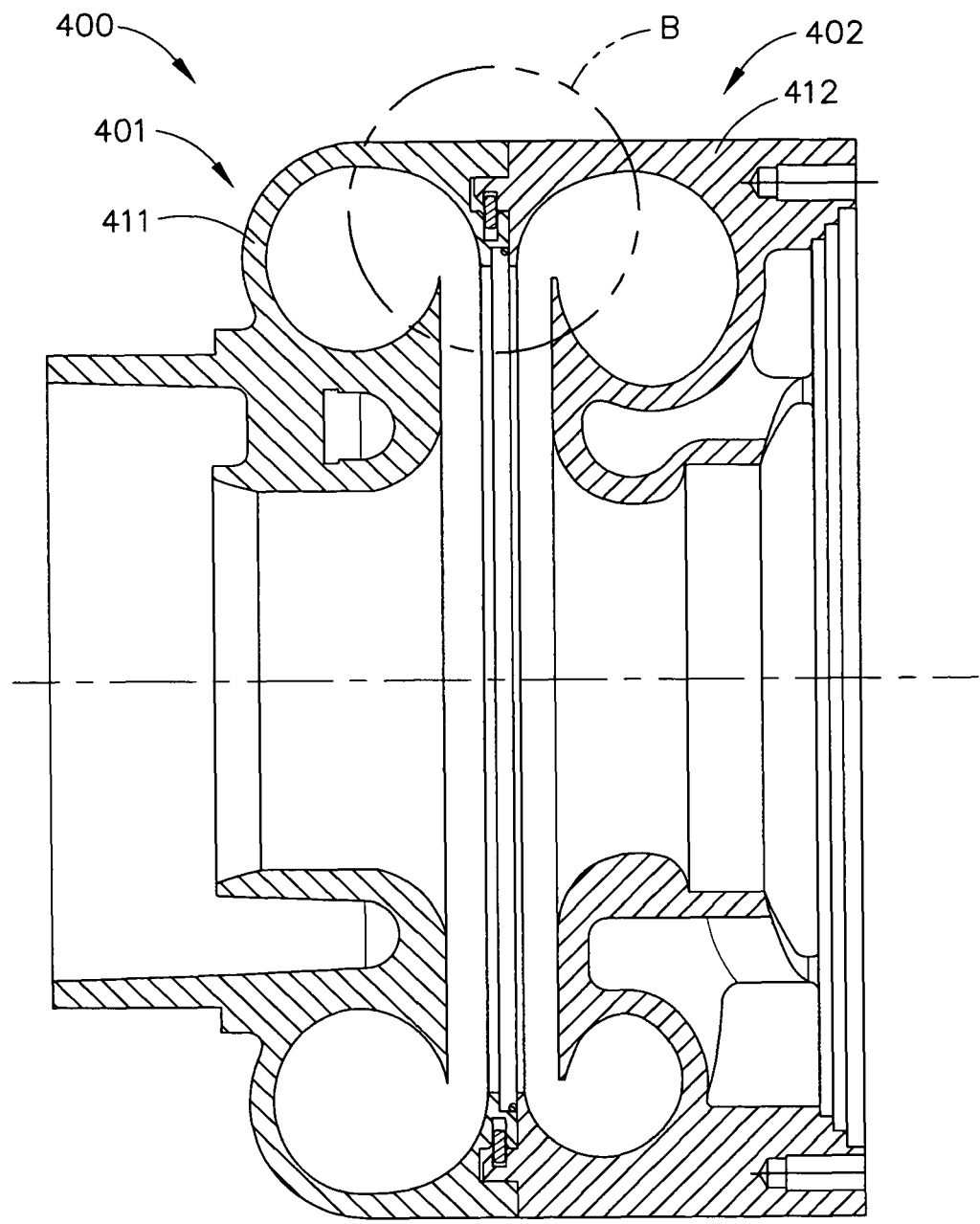
FIG. 4A is a cross section view of an embodiment of the present invention showing a two-stage compressor assembly wherein two compressors are attached using a retaining ring.
Figure 4B:
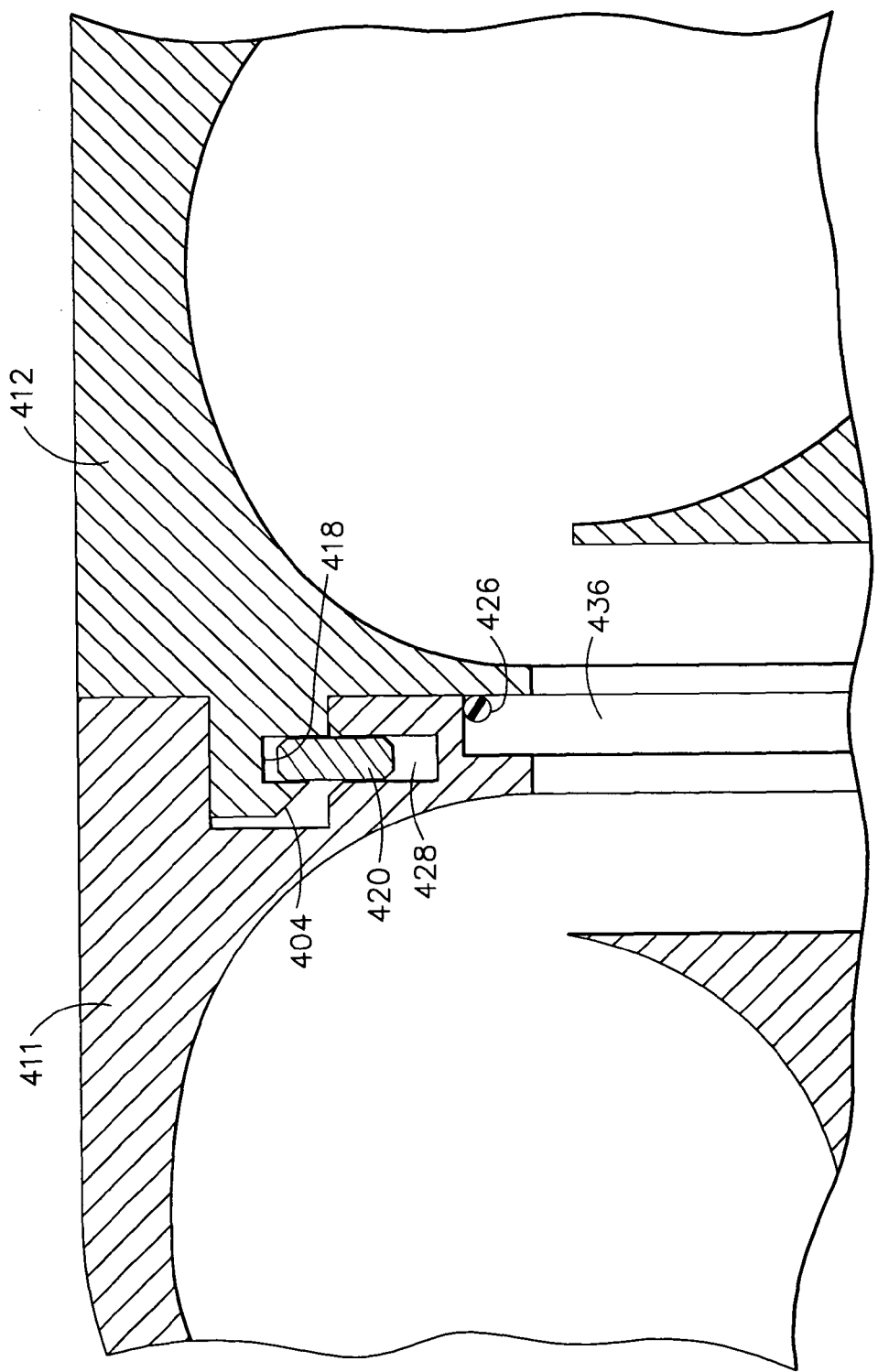
FIG. 4B is a close-up view of the embodiment of FIG. 4.

In the embodiment shown in FIGS. 4A and 4B (FIG. 4B being a close-up view of the area designated "B" in FIG. 4A), two-stage compressor assembly 400 is shown wherein first compressor 401 (low pressure compressor) is attached to second compressor 402 (high pressure compressor) in accordance with the same concept described above with respect to FIGS. 2 and 3. In FIGS. 4A and 4B, housing 411 of compressor 401 comprises ring groove 428 into which ring 420 is disposed prior to assembly of compressor 401 to compressor 402. Housing 412 of compressor 402 comprises mating groove 418. As compressor 401 and compressor 402 are brought together, retaining ring 420 is compressed to lessen its circumference until it reaches mating groove 418 whereupon retaining ring 420 snaps back to its original shape/circumference. Preferably, circumferential chamfer or bevel 404 is provided to aid in the compression of retaining ring 420 as the two turbocharger compressor housings are moved together. As with regard to FIG. 2 vis-à-vis FIG. 3, the orientation of the grooves can be the reverse of that shown in FIGS. 4A and 4B.

Preferably, a leak prevention seal and/or loading component, such as O-ring 226 and O-ring 326 shown in FIG. 2 and FIG. 3, respectively, and O-ring seal 426 with seal plate 436 shown in FIG. 4B, is/are disposed at a juncture of the first turbocharger stage and the second turbocharger stage to seal the respective compressor stage from leakage and/or to function as a spring or loading component. Alternatively, the sealing/loading component can comprise a spring-like device such as, but not limited to, a Belleville spring (or washer) or other component known in the art to carry out the sealing and/or loading function. Also, an orientation component such as, but not limited to, a pin (not shown) may be provided to assure proper orientation of the turbocharger stage components to each other.

The present invention reduces the number of turbocharger parts and costs by eliminating the typical clamp plates and clamp bolts. Additional cost reduction can be realized because neither threaded holes nor the assembly of clamp plates and bolts are required when the present invention is applied, thus reducing machining and turbocharger assembly time (i.e., assembly cycle time). Further, the quality of turbocharger assembly is improved because fastener assembly torques are not required as a result of implementation of the present invention.

The present invention also provides for a tamper resistant assembly of turbocharger stages. Tamper resistance is sometimes desirable as when emission control requirements are imposed given that a turbocharger is typically an integral part of an internal combustion engine's emission control system.

The preceding examples can be repeated with similar success by substituting the generically or specifically described components, mechanisms, materials, and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A turbocharger assembly comprising:
   a first housing that defines a volute, the housing having a ring groove;
   a retaining ring disposed in said ring groove, said retaining ring having an adjustable circumference;
   a second housing adjacent to said first housing, said second housing having a mating groove within which said retaining ring is fitted to mate said ring groove and said mating groove and to secure and lock said first housing to said second housing, said adjustable circumference of said retaining ring oriented along a plane substantially perpendicular to a longitudinal axis of said turbocharger assembly;
   a housing bevel for compression of said adjustable circumference of said retaining ring upon securing said first housing to said second housing; and
   a seal component for prevention of gas leakage from said volute, said seal component disposed at a juncture between said first housing and said second housing upon securing and locking said first housing to said second housing wherein said juncture comprises a planar surface oriented substantially perpendicular to said longitudinal axis and offset axially from said plane of said retaining ring in a direction away from said volute.

2. The assembly of claim 1 wherein said seal component comprises a ring.

3. The assembly of claim 1 wherein said second housing comprises the housing bevel.

4. The assembly of claim 1 wherein said first housing comprises a compressor housing.

5. The assembly of claim 1 wherein said second housing comprises a turbocharger center housing rotating assembly.

6. The assembly of claim 1 wherein said first housing comprises a turbocharger turbine housing.

7. The assembly of claim 1 wherein said bevel comprises a circumferential bevel.

8. The assembly of claim 1 wherein said first housing comprises said housing bevel.

9. The assembly of claim 5 wherein said first housing comprises a housing that defines a compressor volute.

10. The assembly of claim 5 wherein said first housing comprises a housing that defines an exhaust turbine volute.

11. The assembly of claim 1 wherein said seal component acts to prevent leakage of compressed air from said volute.

12. The assembly of claim 1 wherein said seal component acts to prevent leakage of exhaust gas from said volute.

13. The assembly of claim 1 wherein said ring groove faces radially inwardly, wherein said matching groove faces radially outwardly, and wherein, in a locked position, said ring groove and said matching groove are adjacent.

14. The assembly of claim 1 wherein said ring groove faces radially outwardly, wherein said matching groove faces radially inwardly, and wherein, in a locked position, said ring groove and said matching groove are adjacent.

15. A method for attaching turbocharger housings to each other, the method comprising:
   providing a first housing that defines a volute, the first housing having a ring groove;
   disposing a retaining ring having an adjustable circumference in the ring groove, the adjustable circumference of the retaining ring oriented along a plane substantially perpendicular to a longitudinal axis of the turbocharger housings;
   providing a second housing having a mating groove;
   providing a seal component for prevention of gas leakage from the volute;
   bringing the first housing and the second housing together and
   simultaneously changing the circumference of the retaining ring along a housing bevel, and allowing the retaining ring to resume its original circumference, when the ring groove and the mating groove come together, by snapping into position so that the retaining ring resides partially in the ring groove and partially in the mating groove, thus attaching and locking the first housing to the second housing and positioning the seal component at a juncture between said first housing and said second housing wherein the juncture comprises a planar surface oriented substantially perpendicular to the longitudinal axis and offset axially from the plane of the retaining ring in a direction away from the volute.

* * * * *